E. N. Smith.
Paper Folding Mach.
No. 660. Reissued Feb. 8. 1859.
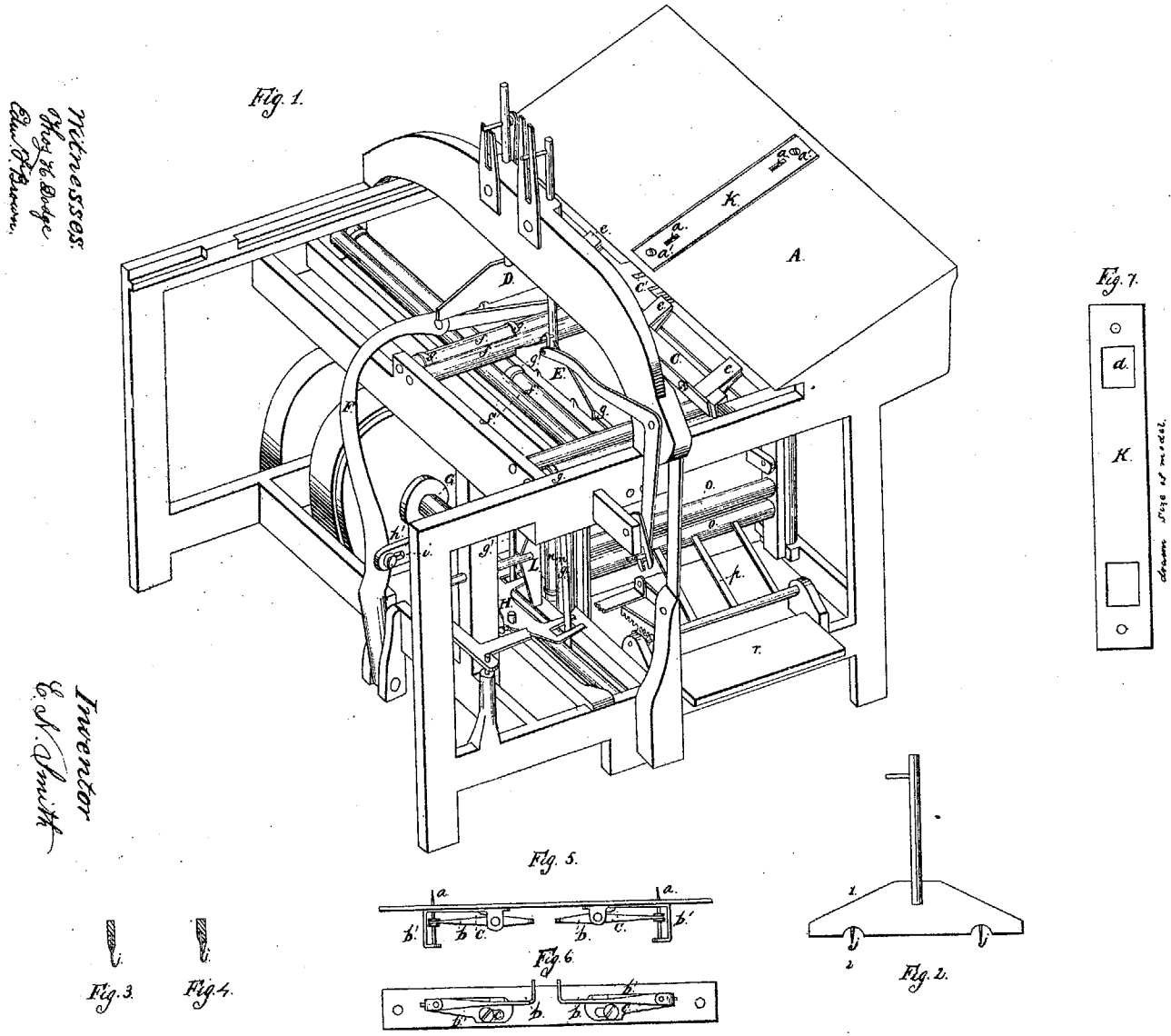
Witnesses.
Thos. H. Dodge
Edw. F. Brown.
Inventor
E. N. Smith

UNITED STATES PATENT OFFICE.

S. T. BACON, OF BOSTON, MASSACHUSETTS, ASSIGNEE OF E. N. SMITH.

IMPROVEMENT IN MACHINES FOR FOLDING PAPER.

Specification forming part of Letters Patent No. 17,352, dated May 19, 1857; Reissue No. 660, dated February 8, 1859.

*To all whom it may concern:*

Be it known that EDWARD N. SMITH, late of Springfield, county of Hampden, in the Commonwealth of Massachusetts, now of Washington, in the District of Columbia, did invent certain new and useful Improvements in Machines for Folding Paper for Books, &c.; and I do hereby declare that the following is a full description thereof.

To enable those skilled in the art to make and use my improvements, I will now proceed to describe the same, reference being had to the accompanying drawings and the letters of reference marked thereon, forming a part of this specification, of which—

Figure 1 is a perspective view of the machine. Fig. 2 is a side view of one of the folding-knives with its needle-points. Fig. 3 is a cross-section of the folding-knife in the line 1 2. Fig. 4 is a modification of the folding-knife and needle-points, as shown in Fig. 3. Fig. 5 is a detached view of the adjustable register points or pins. Fig. 6 is a detached view showing the mode of adjusting the register points or pins. Fig. 7 is a detached view of a portion of the feed-table through which the register-pins work.

The construction of my machine is as follows: To the under side of the feed-table A are the register-pins *a*. These pins are attached to the ends of levers *b*, as shown in Figs. 5 and 6, which are supported in movable plates *b'*. These plates are slotted, so as to be capable of being adjusted in all directions independently of each other by set-screws *c*, as shown in Fig. 6, the feed-table being perforated, as shown in Fig. 7, thus permitting the register-pins to be adjusted to any desired point in the opening *d* of the feed table A. The sliding frame C runs under the table A till a set of fingers, *e*, affixed thereto, reach the lower edge of the table A, when they seize the edge of the properly-registered s t. The register-pins are then withdrawn by the levers to which they are attached, (these levers being operated by any suitable mechanism at the proper time,) and the sheet is carried forward, resting upon the frame C under the folding-knife D, hereinafter described. At the center of the frame C, on the line of the first fold, is a long narrow slit or opening, C', which, by the forward motion of the frame, comes directly under the folding knife D, and through which, by the descent of the folding-knife, the sheet is doubled and forced downward to and between the first pair of folding-rolls, *f*, and extended on the aprons or bands *g*, by which it is carried off horizontally to the proper position for receiving its next fold by the descent of the folding-knife E. The frame C is moved by a curved lever or arm, F, coupled with a crank on the end of the driving-shaft G, by the connecting-rod *h'*, which permits the frame to rest a short time at each end of its vibration by reason of the slot *i* in the connecting-rod *h'*, as fully shown in Fig. 1.

In order to prevent any displacement of the sheet while being acted upon by the folding-knife, it is necessary that the knife should have a very thin edge, but even then there is liability of the displacement of the sheet, to obviate which I cut a portion of the edge of the folding-knife away, as shown in Fig. 2, by which I am enabled to get sufficient width of metal to permit of needle-points *j* being inserted in holes drilled in the center of the same, as shown in Fig. 3. These needle-points extend beyond the edge of the folding-knife, so that as it descends they pierce the sheet, thus insuring the more accurate folding thereof.

One great advantage of this mode of constructing the folding-knife is, the fact that the smooth edge thereof admits of a slight vibration to the paper, excepting at the places pierced by the needle-points. The knife is shown as being cut away about twice the width of the needle on each side of the same; but it is not essential that it should be cut away more than is required to insert the needle-points. Neither is it actually necessary that it should be cut away at all in order that the needles shall receive their main support back of the edge of the knife, since they can be secured to the side thereof in any proper manner.

The principal reason why the needle-points should have their main support back of the edge of the knife is, the fact that the edges of the knives usually employed are too thin to afford adequate support to the needle-points without their being liable to be broken.

The machine is provided with adjustable stops H, (one of which is shown in Fig. 1,) for the purpose of arresting and retaining the sheet in proper positions to be acted upon by the folding-knives after it has passed through the first pair of folding-rolls. The speed at which the sheet is carried from its position after receiving its first fold to that of its next and succeeding folds is so graduated as that it shall occupy the same time, or nearly so, in passing to its position for receiving its various folds, the object which I seek to attain by this construction and arrangement being to permit of the sheets gradually moving slower through the machine, thus insuring greater accuracy to the folds, while at the same time I am enabled to arrange the folding-rolls in a more compact manner and reduce the friction of the machine. I also reduce the liability of the sheets getting out of register or of being subjected to the chafing of the aprons or bands, which would result from its being held by the stop for any considerable length of time prior to its being acted upon by the next folding-knife. The graduation of the speed of the rolls may be gained either by reducing the size of the rolls, or it may be done by gears.

The width of the slots *a*, as shown in Fig. 1 of the drawings, admits of but slight lateral adjustment of the register-pins, but in order to meet the contingencies of the adjustment of said pins in all directions, the width of said slots may be enlarged to permit of the desired adjustment, as shown in Fig. 7.

The operation of the machine may be briefly stated, as follows: The sheet to be folded is fed upon the register-points which project through the feed-table A, when it is seized by the fingers *e*, when, by the backward motion of the carriage C, it is carrieddirectly under the folding-knife D, which, by its descent, forces the sheet down through the slit or opening C′ to and between the folding-rolls *f f*, by which it receives its first fold, and from thence it is extended upon and carried by bands *g* under the second folding-knife, E, where it is arrested by one of the stops H, (not seen in the drawings,) until the folding-knife E descends and forces it between the second pair of folding-rolls, *f′ f′*, by which means it receives its second fold, and is then carried down by the bands *g′*, until it reaches the stop H, as shown in the drawings. Here it receives its third fold by the forward motion of folding-knife L, which forces it in between the folding-rolls *n*, which completes the third fold, from whence it may be conducted to receive any number of succeeding folds by mechanism similar to that described as for making the previous folds. At the last fold the rolls *o o* receive, press, and deliver the sheet to a fly, *p*, by which it is laid upon the receiving-table, *r*. This receiving-table may be made to descend as the sheets are placed upon it by the fly until it reaches its lowest point, when it may be made to give an alarm.

After having described my improvements, what I claim therein as new and of my invention, and desire to secure by Letters Patent, is—

1. The employment of adjustable points or register-pins, or their equivalents, for the purpose of correctly presenting printed sheets to a paper-folding machine, substantially in the manner and for the purpose set forth.

2. The combination of a registering apparatus with a paper-folding machine, substantially in the manner described.

3. The combination of the register-pins with the fingers, reciprocating carriage, and slotted bar, for the purpose specified.

4. The combination of the slotted reciprocating carriage with the knife *d*, as described.

5. The combination of the slotted reciprocating carriage with the first pair of folding-rolls and knife *d*, as specified.

6. The combination of a folding-knife, the edge of which is smooth, with one or more needle-points projecting beyond and in a line with the edge thereof, as shown.

7. Securing the needle-points to the folding-knife in the manner and for the purpose specified.

8. Securing the needle point or points to the folding knife in such a manner as that they shall have their main support back of the edge of said knife, as specified.

9. So constructing paper-folding machines as that the sheet while being folded shall occupy the same time, or nearly so, while passing from the position for receiving its first fold to that of the next and succeeding folds, as specified.

E. N. SMITH.

Witnesses:
THOS. H. DODGE,
EDM. F. BROWN.